(12) United States Patent
Hart et al.

(10) Patent No.: US 7,881,987 B1
(45) Date of Patent: Feb. 1, 2011

(54) SYSTEM AND METHOD FOR PURCHASE ORDER MANAGEMENT

(75) Inventors: Matt E. Hart, Lunenburg, MA (US); Jason A. Hunter, Orem, UT (US); Jeffery D. Campbell, Cedar Hills, UT (US); Walter M. Holladay, Lindon, UT (US); Catherine Fisse, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 1149 days.

(21) Appl. No.: 11/447,658

(22) Filed: Jun. 6, 2006

(51) Int. Cl.
*G06Q 10/00* (2006.01)
*G06Q 30/00* (2006.01)

(52) U.S. Cl. .......................... 705/28; 705/7; 705/26.8; 705/26.81

(58) Field of Classification Search .................... 705/7, 705/26, 28
See application file for complete search history.

(56) References Cited

U.S. PATENT DOCUMENTS

| | | | |
|---|---|---|---|
| 5,608,621 A | 3/1997 | Caveney et al. | |
| 5,638,519 A | 6/1997 | Haluska | |
| 5,893,076 A | 4/1999 | Hafner et al. | |
| 5,987,423 A | 11/1999 | Arnold et al. | |
| 6,341,271 B1 * | 1/2002 | Salvo et al. | 705/28 |
| 6,996,538 B2 * | 2/2006 | Lucas | 705/28 |
| 7,249,068 B1 * | 7/2007 | Kakouros et al. | 705/28 |
| 7,376,600 B1 * | 5/2008 | Wadawadigi et al. | 705/28 |
| 7,801,776 B2 * | 9/2010 | Inskeep et al. | 705/28 |
| 2002/0032668 A1 * | 3/2002 | Kohler et al. | 705/401 |
| 2002/0072988 A1 * | 6/2002 | Aram | 705/26 |
| 2003/0167209 A1 * | 9/2003 | Hsieh | 705/26 |
| 2004/0049415 A1 | 3/2004 | Liou et al. | |
| 2004/0128213 A1 | 7/2004 | Wei | |
| 2004/0143504 A1 | 7/2004 | Tsai | |

(Continued)

FOREIGN PATENT DOCUMENTS

WO WO-0046733 A1 * 8/2000

OTHER PUBLICATIONS

Ekey, D.C., et al., "Inventory Reorder Points for Conditions of Variable Demand and Lead Time" (Abstract only), Journal of Industrial Engineering, vol. 12, No. 1, pp. 32-34, Jan.-Feb. 1961.*

(Continued)

*Primary Examiner*—Nicholas D Rosen
(74) *Attorney, Agent, or Firm*—Osha • Liang LLP

(57) ABSTRACT

A purchasing user interface system may include a user interface configured to display various types of inventory, order and purchasing information. The user interface may display item, inventory, order, sales and/or vendor information regarding particular items, or all items, in a current inventory. The user interface may allow user to customize the manner in which the information is displayed. The system may also aid the user in making purchase orders, such as by allowing the user to select items to order as well as the quantities to order and the vendors from which to order the selected items. The system may also allow the user to generate purchase order based on the selected items, amounts and vendors. The purchasing user interface system may allow a user to display, sort, filter, update and otherwise manipulate various inventory, sales, order and vendor information to aid in making meaningful inventory ordering decisions.

27 Claims, 6 Drawing Sheets

U.S. PATENT DOCUMENTS

| | | |
|---|---|---|
| 2004/0164146 A1* | 8/2004 | Rosenblum .................. 235/381 |
| 2005/0091129 A1 | 4/2005 | Tien |
| 2005/0114235 A1 | 5/2005 | Snyder et al. |
| 2005/0125251 A1 | 6/2005 | Berger et al. |
| 2005/0137944 A1 | 6/2005 | Lu |
| 2005/0234784 A1* | 10/2005 | McClellan et al. ............ 705/28 |
| 2006/0004615 A1* | 1/2006 | Guldner et al. ................ 705/7 |
| 2006/0015414 A1* | 1/2006 | Congram et al. .............. 705/28 |
| 2006/0036499 A1 | 2/2006 | Leu |

OTHER PUBLICATIONS

Anon., "Internet in Manufacturing," Slovak Spectator, Jun. 5, 2000.*
Lohr, S., "Rivals Join in Effort to Advance Next Step in Internet Technology," New York Times, Late Edition—Final Edition, p. 2, col. 5, Wednesday, Feb. 6, 200.*

* cited by examiner

Item List

○ Show all
○ Filter by Preferred Vendor
○ Show all items purchased from this vendor   Preferred Vendor: _____ 450

[create ALL purchase orders] 460
[create PO for selected vendor] 465

| Reorder Qty | Item identifier | Purchase Description | Vendor | Vendor Item # | On Hand | Reorder Point | Purch. Units | On Order | Sold | Avail. | Last Cost | Pend. Builds | Near Reorder |
|---|---|---|---|---|---|---|---|---|---|---|---|---|---|
| ☑ 99 | TRTO-CL | OOTC-TC Track Top | ABC Hardware | TR 35 | 1 | 100 | ea. | 0 | 0 | 1 | 0.00 | 0 | |
| ☑ 99 | PUBR | Pully Bracket | ABC Hardware | PUBR | 4 | 100 | ea. | 0 | 2 | 2 | 0.00 | 0 | |
| ☑ 99 | STRE-1/2 | 52-2298 Strain Relief, | ABC Hardware | stre52 | 2 | 100 | ea. | 0 | 0 | 2 | 0.00 | 0 | |
| ☑ 99 | CEPE | PED-09-3487, Center Pe | ABC Hardware | PED09 | 3 | 100 | ea. | 0 | 0 | 3 | 0.00 | 0 | |
| ☑ 99 | DRPE | Power Trak, Drive Pedes | ABC Hardware | PT-05 | 104 | | ea. | 0 | 0 | 104 | 0.00 | 0 | 4 |

SYSTEM AND METHOD FOR PURCHASE ORDER MANAGEMENT

BACKGROUND

Typically, enterprises, such as retailers, wholesalers, schools, product distributors, and others, maintain an inventory of items, such as might be ordered by customers (internal and/or external) or clients. Similarly, manufacturers generally maintain an inventory of parts and/or materials for use to manufacture various products. Additionally, warehouses, distribution centers, packing facilities, and other order fulfillment centers may also maintain inventories of items, parts, or materials. Orders from customers (or clients) are fulfilled from the current inventory of items.

Many enterprises, such as businesses, have a need to manage inventories of items used and/or sold by the enterprise. For example, a retail business may manage an inventory of items for sale. Likewise, a school or university may manage an inventory of classroom supplies. Similarly, government agencies and non-profit organizations often need to manage inventories.

An enterprise often manages its inventory by tasking one or more people with responsibility for tracking item usage and ordering additional items when needed. For instance, a person in charge of inventory may analyze or balance a host of variables to 20 decide when to more items, such as current inventories, past and projected sales, shipping times, storage requirements, pricing, delivery times, minimum order amounts, and other information. Such a person may have a difficult time maintaining, tracking and analyzing this information often resulting in many mistakes, such as miscounting items in inventory, forgetting to place orders, or miscalculating demand. Additionally, if multiple 25 people are responsible for inventory management, they may have difficulties coordinating their activities. For example, if two people notice that the enterprise is running low on an item, they both might order replacements. Inventory mistakes such as these may be expensive, especially if items require long lead times, are in high demand, or are costly to maintain in stock.

SUMMARY

A system and method for managing, displaying and updating inventory and purchasing information is described herein. A system may include a user interface configured to display various types of inventory, order and purchasing information. For instance, in one embodiment, a user interface may provide information regarding particular items, or all items, in a current inventory. Information such as item name, item numbers, description, vendor item numbers, and the number of items on hand, on order, currently sold, and available may be display in some embodiments. Information regarding vendors supplying the items in inventory, including such information as minimum orders, unit or case size, cost, last cost paid, as well as other types of vendor information may also be displayed, according to one embodiment.

In some embodiments, the system and user interface may allow user to view the information displayed in various manners, such as by allowing the user to sort and filter according to various criteria. For example, a user may select to view all items in inventory or may select to only view items that need to be reordered. Similarly, in one embodiment, the user interface may allow the user to view all items available from all vendors or alternately may allow the user to only view items available from a particular vendor or vendors. The system may allow the user to view currently sales information, such as sales history and projections.

The system and user interface may also aid the user in making purchase orders, such as by allow the user to select items to order as well as the quantities to order and the vendors from which to order the selected items. The system may also display reminder information, such as amounts of inventory stock as which replacement items should be ordered or a target amount of inventory stock to maintain in inventory.

The system may also allow the user to generate purchase orders based on the items, amounts and vendors selected through user input. For example, the system may allow the user to select to generate purchase orders for all items selected for reorder. Alternatively, the system may allow the user to only generate purchase orders for a particular one or more selected vendors. The system and user interface described may include an automated inventory tracking and management system or may only provide a user interface to aid in manual inventory tracking and management, according to various embodiments. Thus, the purchasing user interface system described herein may allow a user to display, sort, filter, update and otherwise manipulate various inventory, sales, order and vendor information to aid in making meaningful inventory ordering decisions.

BRIEF DESCRIPTION OF THE DRAWINGS

FIG. 4 illustrates one embodiment of a user interface for displaying inventory, sales and purchasing information, as described herein.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must).

Similarly, the words "include", "including", and "includes" mean including, but not limited to.

DETAILED DESCRIPTION OF EMBODIMENTS

Figure 1:
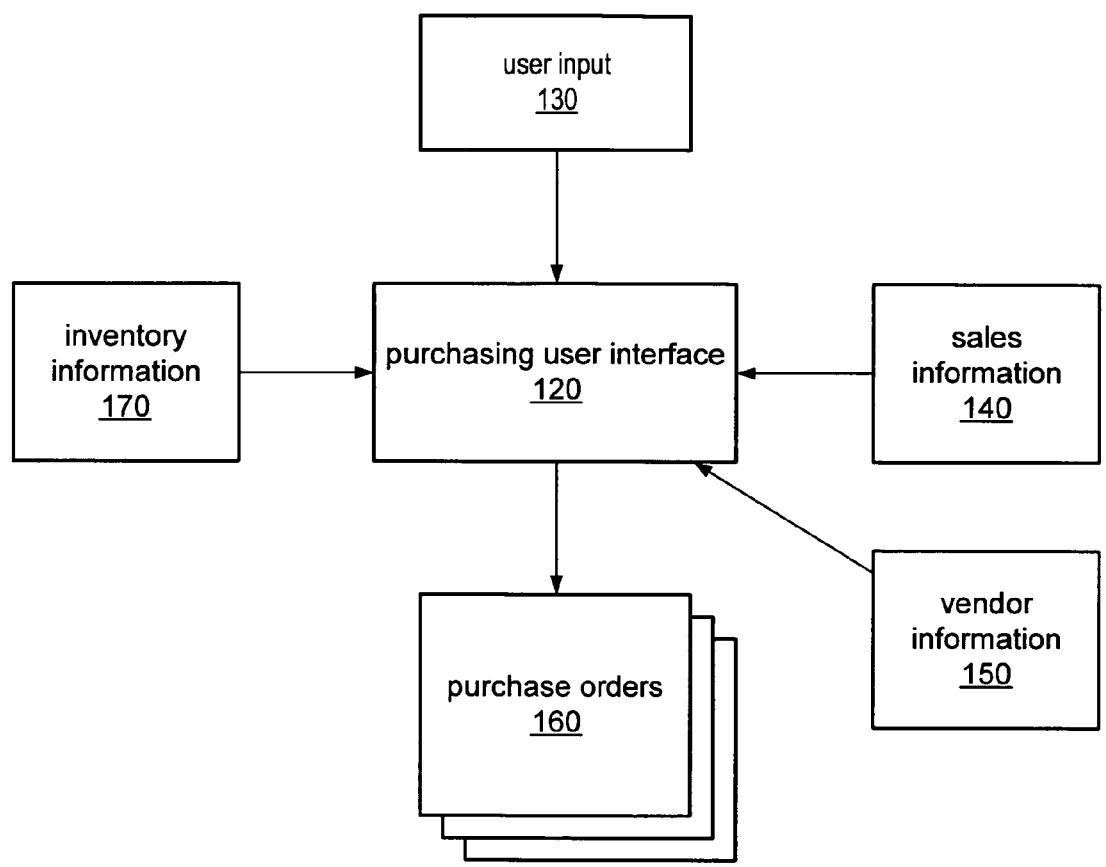
FIG. 1 is a block diagram illustrating one embodiment of a purchasing user interface system as described herein.

A purchasing user interface system, as described herein, may be configured to display various inventory, sales, order, and vendor information, according to various embodiments. Additionally, a purchasing user interface system may generate purchase orders based on the inventory, sales, order, and vendor information and according to received user input. FIG. 1 is a high-level block diagram illustrating one embodiment of a purchasing user interface system, as described herein.

As illustrated in FIG. 1, purchasing user interface 120 may display information regarding a current inventory of items. For example, purchasing user interface 120 may display inventory, sales, vendor, and order information regarding items of a current inventory. Additionally, purchasing user interface 120 may receive user input specifying what and how information should be displayed. For instance, purchasing user interface 120 may be configured to allow a user to select the particular types of inventory, sales, and/or vendor information to display and may additionally be configured to allow the user to customize the manner in which that information is displayed. Purchasing user interface 120 may be a standalone software application, such as may execute on a desktop PC, in one embodiment. In another embodiment however, purchasing user interface 120 may be part of a larger software application or system integrating various sales, purchasing, receiving, inventory, shipping and other functions. In yet another embodiment, purchasing user interface 120 may be implemented using various web-enabled technologies, such as may be accessed via any of various web browsers.

As noted above, purchasing user interface 120 may display inventory information regarding a current inventory of items. Inventory information 170 may comprise inventory information regarding a current inventory of items, in one embodiment. As will be discussed in more detail below, inventory information 170 may be stored in any of various manners, such as in an electronic database or other computer storage. Inventory information 170 may further include information regarding items from one or more inventory locations, according to various embodiments. For example, a business may utilize inventory stored or located in more than one physical location, such as in various regions of the country, and inventory information 170 may include inventory information regarding one, multiple, or all such inventory locations. Purchasing user interface 120 may display information regarding all items in the current inventory or may only display information regarding a selected one or more items, according to different embodiments. In one embodiment, as will be discussed in more detail below, purchasing user interface 120 may be configured to allow a user to select, sort, or filter the items for which purchasing user interface 120 displays information. Purchasing user interface 120 may display various types of pieces of inventory information regarding the items in the current inventory. For example, purchasing user interface 120 may display inventory information including item names, item numbers, item descriptions, item locations (e.g. where the item is physically inventoried), numbers of items on hand, numbers of items currently sold, numbers of items currently available, among other item inventory information, according to various embodiments.

Purchasing user interface 120 may also display sales information, such as from sales information 140, regarding the current inventory of items. For example, in one embodiment purchasing user interface 120 may display the number of a particular item that has currently been sold but not shipped (and thus still in inventory). Additionally, purchasing user interface 120 may display other sales information, such as historical sales information, projected sales information and sales growth information, in various embodiments. Sales information 140 may include information regarding retail sales, wholesale sales, contract sales, and/or internal sales, in different embodiments. Sales information 140 may represent information that is actually located in various and multiple distinct datasets, files, and/or databases, in one embodiment. Additionally, sales information 140 may not be limited to sales information by may also include information regarding usage of inventory items. For example, in one embodiment, sales information 140 may include information regarding the internal usage of various supplies used in a school, company, or manufacturing facility, for instance. Thus, while referred to as sales information herein, sales information 140 may include and purchasing user interface 120 may display information regarding virtually any types of activity that removes items from inventory.

Purchasing user interface 120 may also display vendor information, such as from vendor information 150, regarding the current inventory of items, in some embodiments. For example, purchase user interface 120 may display one or more vendors from which a particular item may be obtained, such as in a pull down menu or other list. Vendor information 150 may include, and purchasing user interface 120 may display, information regarding both internal and external vendors. For instance, in one embodiment, vendor information 150 may include internal vendors that supply components used to build larger systems in a manufacturing company. Vendor information 150 may include various types of vendor information, such as vendor names, vendor item numbers, vendor contact information, vendor ordering information and vendor status information, as well as additional types of vendor information, as will be described in more detail below.

As noted above, purchasing user interface 120 may also receive user input 130 in some embodiments. For example, purchasing user interface 120 may receive user input 130 that selects, sorts, filters, updates, or otherwise manipulates the various pieces of information displayed. For example, purchasing user interface 120 may be configured to allow a user to specify a sort order for how information should be displayed. Similarly, purchasing user interface 120 may be configured to allow a user to filter the items for which information is displayed. Additionally, purchasing user interface 120 may be configured to allow a user to search for a particular item for which information is displayed. Purchasing user interface 120 may also be configured to allow a user to specify order information, such as what items to order, how many of an individual item to order, a particular vendor to order an item from, as well as other types of order information.

Purchasing user interface 120 may also receive user input 130 that configures how information is displayed in purchasing user interface 120. For example, purchasing user interface 120 may be configured to allow a user to modify the order in which information is displayed. In another example, purchasing user interface 120 may be configured to allow a user to change which particular information is displayed for each item. In some embodiments, purchasing user interface 120 may be configured to allow a user to update or modify the particular values of information displayed for inventory items. In other embodiments, however, purchasing user interface 120 may be configured to only allow certain types of information to modified or updates, or may be configured to only allow certain users or certain types of users to modify or update information. For example, in one embodiment, purchasing user interface 120 may be configured to only allow a sales manager to modify or update projected sales information.

Purchasing user interface 120 may also be configured to receive user input selecting one or more items to order and may generate purchase orders 160 accordingly. Purchasing user interface 120 may be configured to generate purchase orders 160 in various manners according to different embodiments. For example, in one embodiment purchasing user interface 120 may be configured to generate printed purchase orders. In other embodiments, purchasing user interface 120 may be configured to generate electronic or web-based purchase orders. In yet other embodiments, purchasing user interface may be configured to communicate with and/or transfer purchase order information to a separate purchase order system for the generation of purchase orders 160. Thus, in one embodiment, purchasing user interface 120 may display information, such as inventory, sales and vendor information regarding a current inventory of items, receive user input selecting items to order, receive user input specifying amounts of the selected items to order and vendors from which to order the selected items from, and generate purchase order to accomplish the ordering of the selected items in the specified amounts from the specified vendors.

Please note that FIG. 1 illustrates one example embodiment of a purchasing user interface system, as described herein. Other embodiments may include different, additional or fewer components or may receive information and/or input from different sources. Additionally, FIG. 1 and others of the figures use like reference numerals to identify like elements. A letter after a reference numeral, such as "114A", indicates that the text refers specifically to the element having that particular reference numeral including the same letter. A reference numeral in the text without a following letter, such as "114" refers to any or all of elements bearing that reference numeral in any or all of the figures (e.g. "114" in the text refers to reference numeral "114A" and/or "114B" in the figures).

Figure 2:
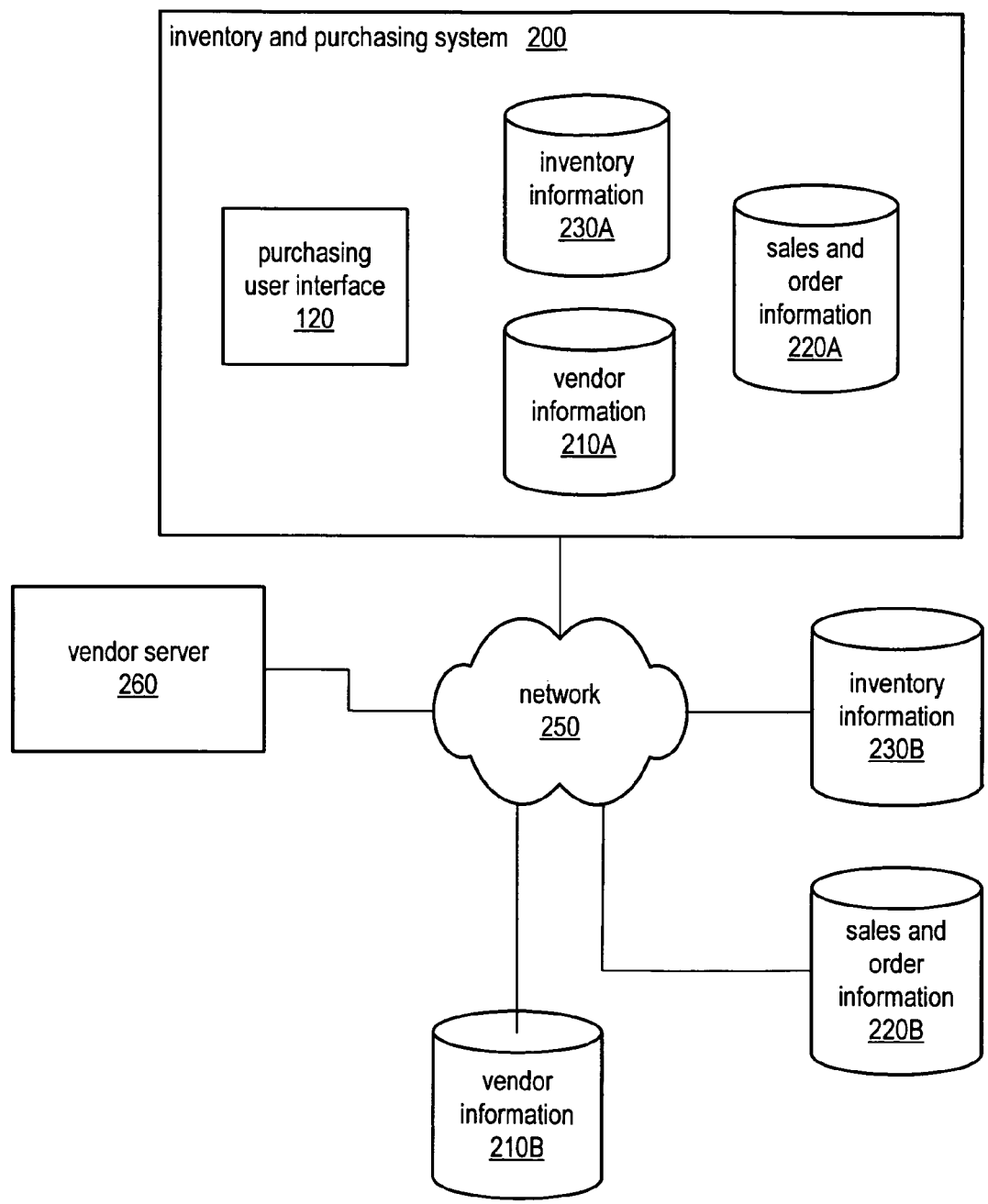
FIG. 2 is a high-level block diagram illustrating one embodiment of a networked environment suitable for implementation of a purchasing user interface system, as described herein.

FIG. 2 is a high-level block diagram illustrating one embodiment of a networked environment suitable for implementation of a purchasing user interface system, as described herein. Purchasing user interface 120 may execute, either as a standalone application or as part of larger application, on an inventory and purchasing system 200, according to various embodiment. System 200 may be a computer utilized by an enterprise, business, school, university, government agency, non-profit group, or other entity or organization, to manage an inventory of items, such as goods to be sold, classroom supplies, office supplies or other items requiring management.

System 200 may also include various files, databases or other dataset of information used and/or displayed by purchasing user interface 120. For example, inventory information 230A may store or maintain inventory information for a number of items and purchasing user interface 120 may access inventory information 230A to gather various types of inventory information. Similarly, inventory information 230B may store or maintain inventory information regarding a number of items and purchasing user interface 120 may access inventory information 230B, such as over network 250, to gather various types of inventory information. Inventory information 230A and 230B, referred to collectively herein as inventory information 230, may maintain information regarding an inventory of items. Inventory information 230 may store inventory information in a database and may store information about current inventory (e.g. the quantity of an item currently in stock). Additionally, inventory information 230 may include a unique item identifier, such as an SKU, to identify each item or item type for which information is stored.

In one embodiment, inventory information 230A and inventory information 230B may include similar types of information but for different types or location of items. In other embodiments, inventory information 230A and inventory information 230B may include different types of inventory information and may include some similar and some different types of information. Similarly, according to some embodiments, inventory information 230A and inventory information 230B may include information regarding similar items and/or item types. In other embodiments however, inventory information 230A and inventory information 230B may include information regarding different items and/or item types. For example, in one embodiment, inventory information 230A may include information regarding items stored or inventoried at one physical location while inventory information 230B may include information regarding items stored or inventoried at a different physical location. Additionally, in some embodiments, inventory information 230A or 230B may integrate with other systems external to purchasing user interface 120, such as other inventory management software, shipping and receiving systems, and point-of-sale systems.

When displaying information for items, purchasing user interface 120 may combine the information from both inventory information 230A and inventory information 230B into a single set of information or a single set of items, in some embodiments. In one embodiment, purchasing user interface 120 may be configured to indicate whether information was gather from or is stored in either inventory information 230A or inventory information 230B.

Purchasing user interface 120 may also access and gather information from sales and order information 220A and 220B as well as from vendor information 210A and 210B. Sales and order information 220A and 220B may maintain sales information similar to that described above regarding sales information 140 and, in some embodiments, may be identical to sales information 140. Similar to inventory information 230A and 230B, sales and order information 220A and 220B may store similar sales and order information or different sales and order information, according to various embodiments. In other embodiments, sales and order information 220A may store different types of sales and order information than stored in sales and order information 220B. For instance, sales and order information 220A may store current sales and order information while sales and order information 220B may store historical and/or projected sales and order information. For example, sales and order information 220 may maintain historical information regarding the quantity of an item or items sold or used over a period of time, when orders for items were placed, when ordered items arrived, as well as other historical sales and/or order information.

Similarly, vendor information 210A and vendor information 210B may store either similar or different vendor information or similar or different types of vendor information, according to different embodiments. For example, vendor information stored in vendor information 210A or 210B may include information such as vendor contact information (e.g. names, telephone numbers, physical addresses), vendor financial information (e.g. bank routing numbers), vendor item stock information, vendor item identification (e.g. SKUs), vendor shipping information, vendor lead times (e.g. an amount of time required for a vendor to acquire and ship an item), and other vendor information.

Purchasing user interface may also access, communicate with or otherwise interact with vender server 260, such as to obtain vendor item information, pricing, stock amounts, and other vendor information, in some embodiments. Additionally, in some embodiments, purchasing user interface may also communicate with vender server as part of an automatic ordering system, such as to transfer an electronic purchase order to vender server 260. Vender server 260 may represent one or more computers operated by venders who supply items, such as the items for which purchasing user interface 120 displays information. For example, vender server 260 may represent computers operated by retail stores, wholesalers, internal suppliers, upstream manufacturers, and/or other entities that supply items, such as the items for which information is displayed by purchasing user interface 120. In some embodiments, vendor server 260 may represent a computer operated by the same enterprise, organization or entity that operates system 200 and purchasing user interface 120. For example, a large manufacturing facility may use purchasing user interface 120 to manage and track internal inventories of materials, items, and/or components used in the manufacturing process and supplied by various internal departments or divisions. Vendor server 260 may be configured to supply item information, either periodically on request, or in real-time, to purchasing user interface 120. For example, vender server 260 may be configured to operate as an information server supplying item information offered for sale by one or more vendors.

Thus, purchasing user interface 120 may access and gather information from various source, such as from files store on the same machine or system on which purchasing user interface 120 executes as well as from remote data sources, such as from remote file servers, remote data storage devices, web servers, or other remote data sources. As noted above, inventory information 230, vendor information 210, and sales and order information 220 may represent one or more actual databases of information. For example, in one embodiment, inventory information 230, vendor information 210 and sales and order information 220 may be stored in a single database. As used herein, the term "database" encompasses any store of information, and does not imply any particular data format, organization, or access protocol. For example, in one embodiment, inventory information 230 may represent a relational database, while in other embodiments, inventory information 230 may represent a flat-file database or any suitable dataset or other file storing information arranged in different formats.

While FIG. 2 only illustrates one system 200, one vendor server 260 and a limited number of data sources, in some embodiments, purchasing user interface 120 may execute in an environment that may include many more systems, servers and data sources connected via various networks and network infrastructures.

Figure 3:
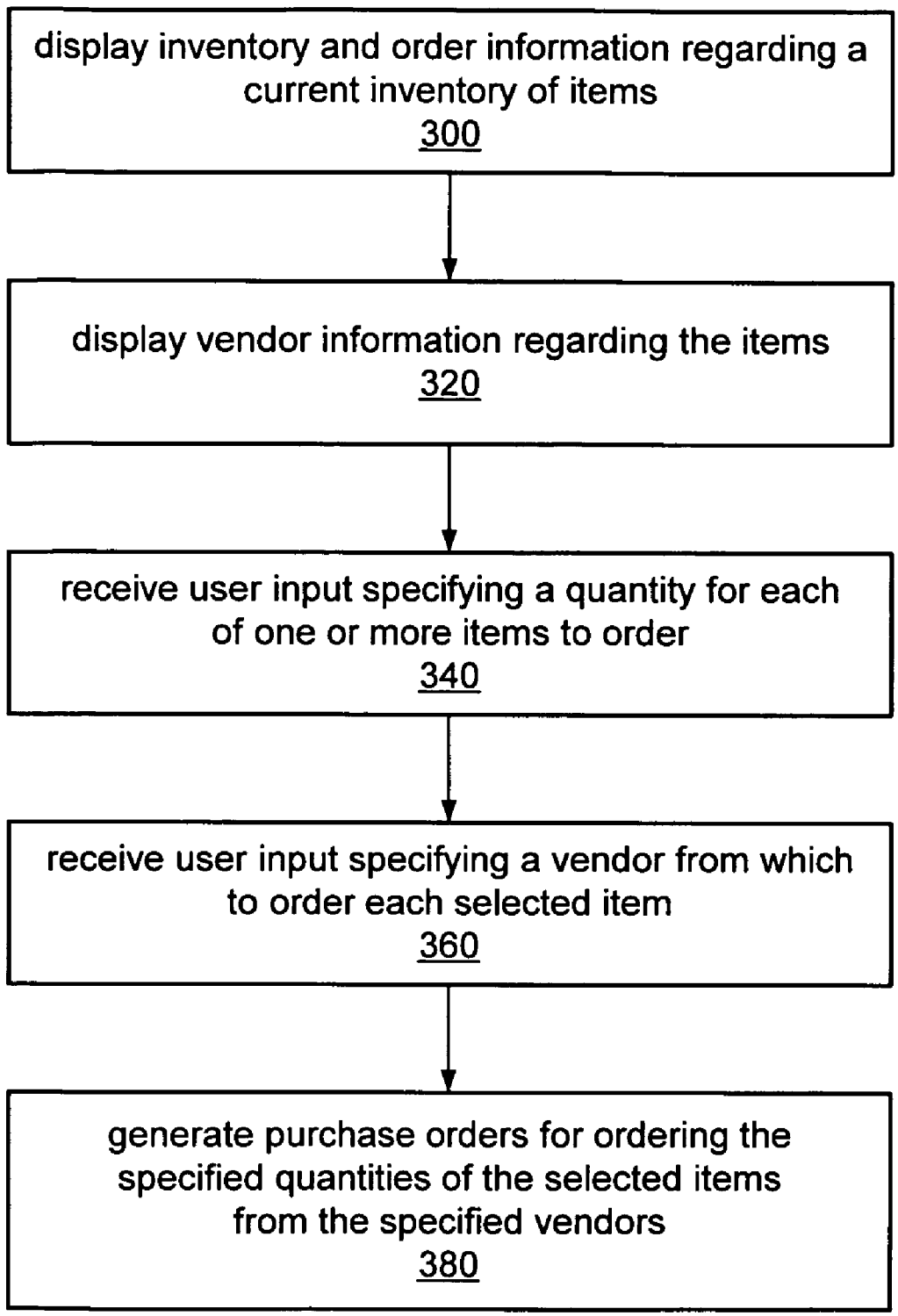
FIG. 3 is a flowchart illustrating one embodiment of a method for a purchasing system, as described herein.

FIG. 3 is a flowchart illustrating one embodiment of a method for a purchasing user interface system, as described herein. As indicated by block 300, a purchasing user interface, such as purchasing user interface 120 may display inventory and order information regarding a current inventory of items. As described above, purchasing user interface 120 may display inventory information, such as item names, descriptions, quantities on hand (e.g. in stock) and other inventory information regarding one or more items. Similarly, purchasing user interface 120 may also display sales and order information, such as quantities sold, ordered, projected to be sold, and other sales and/or order information regarding the same items, as described above regarding sales information 140 and sales and order information 220.

Additionally, as illustrated by block 320, purchasing user interface 120 may display vendor information regarding the items, such as vendor information 150. As described above, purchasing user interface 120 may be configured to display one or more vendors from which a particular item may be obtained as well as information regarding the particular vendor, such as the quantity of the item that vendor may have in stock, the cost of the item via that vendor, vendor contact information, and other information, as will be discussed in greater detail below.

As described above, purchasing user interface may access one or more databases, dataset or other files, to gather various types and pieces of inventory, sales, order and or vendor information to display. Purchasing user interface 120 may display the information in any of a number of manners. For example, purchasing user interface 120 may display a list of items maintained in the current inventory along with the inventory, sales and order information regarding each particular item in the list. For instance, in one embodiment, purchasing user interface 120 may display the information regarding items using a table of rows and columns, where each row may represent a single item and where different types of information are displayed in each column. Purchasing user interface 120 may display the information in any of various manners, such as in a graphical user interface including both graphical and textual elements, as will be discussed in more detail below regarding FIG. 4. Alternatively, purchasing user interface 120 may display the information in a purely textual manner, according to one embodiment.

While describe above as two separate actions, in some embodiments, purchasing user interface 120 may display inventory, order, and vendor information regarding the inventory items at substantially the same time. For example, purchasing user interface 120 may display the inventory, order, sales and vendor information for one item all at the same time, such as in a single row of a table or spreadsheet.

As illustrated by block 340, purchasing user interface 120 may receive user input selecting an amount for each of one or more items to order. For example, purchasing user interface 120 may be configured to allow a user to select or specify one or more items to order and a quantity of each item to order. Purchasing user interface 120 may be configured to allow a user to select an item to order separately from specifying a quantity or amount of an item or may be configured to recognize the user specifying a quantity to order as selecting an item to order. For instance, in one embodiment purchasing user interface 120 may provide a text edit field allowing a user to type in a quantity of an item to order. In another embodiment, purchasing user interface 120 may provide a scroll bar or other graphical user interface control allowing the user to select a quantity of an item to order. Purchasing user interface 120 may also provide a check box or other graphical control allowing a user to select a particular item to order. Additionally, purchasing user interface 120 may be configured to provide pop-up or pull down menus allowing a user to either select an item or to specify a quantity of an item to order. In general, purchasing user interface 120 may be configured to utilize any suitable user interface elements and/or controls to allow a user to select items and/or specify quantities of items to order.

Purchasing user interface 120 may also be configured to receive user input specifying a vendor from which to order each selected item, as indicated by block 360. For instance, purchasing user interface may provide a pull down or popup menu listing various vendors from which an item may be ordered. In another embodiment, purchasing user interface 120 may provide a text edit field allowing a user to type a name or identifier for a vendor. In some embodiments, purchasing user interface 120 may suggest a vendor or provide a default vendor for one or more items, either when originally displaying vendor information regarding the item or in response to user input selecting the item to order.

In some embodiments, purchasing user interface 120 may be configured to allow a user to specify a single vendor from which to obtain multiple items. For example, purchasing user interface 120 may allow the user to select multiple items, such as with a mouse click-and-drag type interface, and then select a single vendor from which to order all the selected items. Additionally, in some embodiments, purchasing user interface 120 may be configured to provide a popup dialog box or other user interface control allowing the user to specify an amount or quantity of an item to order as well as to specify a particular vendor from which to obtain the item.

As indicated by block 380, purchasing user interface 120 may also generate purchase orders for ordering the specified quantities of the selected items from the specified venders. For example, a user may select to have purchasing user interface 120 generate all purchase orders necessary to order all the selected items to order. Additionally, purchasing user interface 120 may be configured to generate purchase orders on a vendor-by-vendor basis. In other words, a user may select a particular vendor and request purchasing user interface 120 generate purchase orders to order all the items specified to be ordered from that particular vendor.

In some embodiments, purchasing user interface 120 may generate printed purchase orders, while in other embodiments, purchasing user interface 120 may be configured to generate electronic purchase orders, such as email based, facsimile based, or web-based purchase orders. Additionally, in some embodiments, purchasing user interface 120 may be configured to communicate electronically with a separate vendor system, such as vender server 260, according to a particular electronic purchasing or ordering protocol to generate purchase orders for certain vendors. In some embodiments, purchasing user interface 120 may be configured to allow a user to specify, such as on a vendor-by-vendor or purchase order by purchase order basis, what type or format of purchase orders to generate. In other words, a user may select to printed purchase orders generated for one vendor while using electronic purchase orders for another.

Thus, purchasing user interface 120 may be configured to allow a user to view, browse and analyze inventory, order, sales, and vendor information regarding multiple items, as well as specify quantities of items to order from particular vendors and to generate purchase orders for ordering the selected items from the corresponding vendors. As is common with computer user interfaces, purchasing user interface 120 may be configured to save the user's work in progress, either automatically or in response to specific save commands, so that a user may not be required to select all items to be ordered at one time. Similarly, the user may select items to order, including specifying order quantities, but may not generate purchase orders until a later time or date.

In some embodiments, purchasing user interface 120 may be configured to interface or communicate with other modules, components and/or applications of a larger inventory and purchasing system, such as to obtain a manager's approval before generating or transmitting purchase orders.

Please note that FIG. 3 illustrates but one embodiment of a method for a purchasing user interface system. Other embodiments may perform different and additional actions, functions, or steps that described regarding FIG. 3 above. Similarly in other embodiments the actions and functions described above may be performed in different orders and by different entities than described above.

FIG. 4 illustrates one embodiment of a user interface for displaying inventory, sales and purchasing information, as described herein. The user interface illustrated in FIG. 4 may be displayed by purchasing user interface 120 as part of displaying inventory, sales, order, and/or vendor information for a current inventory of items. User interface 400 may represent a window or dialog box displayed as part of a larger user interface by purchasing user interface 120.

As illustrated in FIG. 4, user interface 400 includes a list of items and various pieces of information regarding each item. User interface 400 includes different user interface areas, each including different user interface elements or controls allowing the user to manipulate the information displayed and/or the actions performed by purchasing user interface 120 in user interface 400. For example, user interface 400 includes radio buttons 490 allowing a user to select to have purchasing user interface 120 show all items, filter the item list to only show items available from a particular vendor, or to show all items that have been purchased from a particular vendor. User interface element 450 may be configured to allow a user to select or specify a particular vendor on which to filter. In response to a user selecting a particular vendor via user interface element 450, purchasing user interface 120 may update the display of information to only include items available from that particular vendor and/or according to the user selection of filtering criteria via radio buttons 490, according to various embodiments. For example, if a user has selected to "show all items purchased from this vendor" filtering criteria via radio buttons 490 and selected a particular vendor via vendor list 450, purchasing user interface 120 may only display items that have been purchased (or ordered in some embodiments) from that particular vendor and may not display information regarding items that are available, but not purchased, from that particular vendor.

Please note that FIG. 4 represents only one embodiment of a user interface 400 for displaying inventory, sales, order, and/or vendor information regarding a current inventory of items and in other embodiments, different user interface elements may be used to display information or to allow the user to control or manipulate the display.

Additionally, while user interface 400 allows a user to filter the information displayed by a particular vendor, in other embodiments, purchasing user interface 120 and/or user interface 400 may allow the user to filter information according to different or additional criteria.

User interface 400 also illustrates a scrollable listing of items and corresponding item information as a table of rows and columns, according to one embodiment. For example, row 465 displays the headings or titles for the information displayed in the corresponding column. As is common in user interfaces, purchasing user interface 120 may be configured to allow the user to sort the table of information according to the contents of any column, such as by using a mouse-activated pop-up menu for each column, in some embodiments. Thus, a user may be able to sort the information in the table by item identifier, purchase description, vendor, or in general according to the contents of any displayed column.

User interface 400 also includes two push button controls 460 and 465 allowing the user to request the generation of purchase orders. For example, in response to a user selecting push button 460, purchasing user interface 120 may generate all purchase orders corresponding to, or necessary to, order all currently selected items in the quantities specified and from the vendors specified, as described above. Similarly, in response to a user selecting push button 465, purchasing user interface 120 may generate one or more purchase order corresponding to, or necessary, to order all currently selected items to be ordered from a particular vendor, such as a vendor specified using user interface element 450.

The individual rows 470, 475, 480, 485 and 487 display individual items and their corresponding information according to the different informational columns. For example, the reorder quantity column may allow a user to specify both that an item should be ordered and a quantity of the item to order. In one embodiment, the reorder quantity column may include a checkbox, or other selection element, and a text edit field, as illustrated in FIG. 4. In other embodiments, other user interface elements may be used. In one embodiment, the user may only have to specify the quantity to order and purchasing user interface 120 may automatically select the checkbox. In other embodiments, however, purchasing user interface 120 may be configured to allow the user to specify the order quantity and to separately select the checkbox, such as to allow the specification of a proposed order quantity without actually selecting the item to be ordered.

According to various embodiments, other information displayed in the table of information may include, item identifier, which may include an item code, SKU or other identifier, a purchase description, which may include a longer description of the item, a vendor (or vendors) from which to order the item, and a vendor item number, which may comprise a vendor specific item identifier, such a SKU. In some embodiments, purchasing user interface 120 may be configured to display certain types of information, such as a list of all vendors from which an item may be obtained, in separate displays, such as in separate popup windows. For example, purchasing user interface 120 may an item in the corresponding individual information row (such as 470, 475, 480, 485 and/or 487), but to display a popup window (or popup menu) listing all vendors from which the relevant item may be obtained, such as in response to appropriate user input. As described above, the information displayed, such as the item identifier, description, and vendor information may be gathered from various databases such as inventory information 240 and vendor information 210.

Purchasing user interface 120 may also display additional numeric information regarding each displayed item. For example, purchasing user interface 120 may display the quantity of an item that is currently "on hand" (e.g. in stock), the quantity "on order", the quantity currently "sold", the quantity "available". In some embodiments, purchasing user interface 120 may display calculated fields or may automatically update fields based on the values in other fields. For example, purchasing user interface 120 may automatically calculate and display the values in the "available" column based on subtracting the sold quantity from the quantity on hand, rather than using an available value from an inventory database. Please note that in some embodiments, certain values, especially calculated values may be negative. For example, purchasing user interface 120 may display a negative available quantity if there are more units of an item sold than are currently on hand.

In some embodiments, purchasing user interface 120 may display a "reorder point" value, which may represent a quantity of an item as which the user should reorder. For example, a reorder point of 100, such as for the item in row 470, may indicate that if the available quantity of the item falls to or below 100, additional units of the item should be reordered. Reorder points may be defined by the individual user or may be based on company or enterprise-wide rules and/or policies, according to various embodiments. Purchasing user interface 120 may also indicate whether an item is near its reorder point. In some embodiments, the near reorder value is the quantity of an item that is available to be sold (or used) before the item reaches its reorder point. For example, if an item, such as the item in row 475, has a reorder point 100, and has 104 units available, purchasing user interface 120 may display a near reorder value of 4. In some embodiments, purchasing user interface 120 may display a near reorder value in a visually different manner, such as in red colored text. In other embodiments, purchasing user interface 120 may display a near reorder value in different manner, such as in different colors, to represent how close to a reorder point an item is. For example, a near reorder point may be displayed normally if the item is not within 50% of its reorder point, in yellow if it is within 25% of its reorder point and in red if it is within 10% of its reorder point. In some embodiments, purchasing user interface 120 may be configured to allow a user to customize the manner in which a reorder point is displayed, such as by defining the percentages used to determine how to display a near reorder point value.

In some embodiments, the displaying of an item's reorder point and its near reorder point values may be linked. For instance, in one embodiment, purchasing user interface 120 may be configured to display an item's near reorder point value until the item reaches it reorder point at which point purchasing user interface 120 may be configured to stop displaying the items near reorder point value and display the items reorder point. In other words, in some embodiments, an items reorder point value may only be displayed when the item has reached its reorder point and may an items near reorder point value may only be displayed if the item has not reached its reorder point value. In certain embodiments, purchasing user interface may be configured to allow the user to specify how, and if, the displaying of an item's reorder point and near reorder point values are linked.

In some embodiments, purchasing user interface 120 may suggest a default reorder quantity for an item, such as based on the values in other columns for that item. For example, purchasing user interface 120 may have automatically filled in a reorder quantity of 98 based on a minimum quantity to have on hand, on hand, on order, sold and/or available columns. Purchasing user interface 120 may also be configured to allow a user to change, modify or otherwise override a default reorder quantity supplied or suggested by purchasing user interface 120. In other embodiments, purchasing user interface 120 may not automatically fill in reorder quantities.

Purchasing user interface 400 may also display a "pending build" value that may represent a number of units of an item expected to be required, but do not have to be available currently. For example, manufacturing facility may have a planned build of a certain number of components, for which the "pending build" quantity of an item would be needed. However, unlike the sold qty, the pending build quantity generally may change over time and may not be taking into account when determining or calculating an available value.

In some embodiments, purchase user interface 120 may calculate or update one or more of the values displayed in user interface 400 according to a set of purchasing rules. For example, purchasing user interface may be part of, or interact with, a rules database, module or engine defining part, or all, of the behavior of purchasing user interface 120. For example, a rule may specify the calculation used for determine a default reorder quantity, or when to display a reminder to the user that a particular item is near its reorder point.

Purchasing user interface 120 may also display additional information for each item, such as a value representing a "purchase unit" (e.g. each, case, gross), the "last cost" of the item (e.g. the cost of the item the last time it was ordered). Additionally, purchasing user interface 120 may display vendor lead times regarding items. In some embodiments, vendor lead time information may be received from vendor database or vendor servers, such as vendor server 260. In other embodiments, vendor lead times may be based on historical date regarding the particular vendors.

In some embodiments, purchasing user interface 120 may be configured to allow a user to modify, update or change the value in some or all of the displayed fields. After a value is updated, purchasing user interface 120 may, in some embodiments, update a database, such as inventory information 230 (or vendor information 210 or sales and order information 220) to reflect the modified value. In other embodiments, purchasing user interface 120 may be configured to only allow certain users or certain types of user (e.g. managers, or administrators) to modify or update certain types of information.

In one embodiment, the user may select the types of information that are displayed for each item. Additionally, purchasing user interface 120 may be configured to allow a user to dynamically reorder, resize, vary, or alter the types of displayed information for give item and/or vendor. For example, purchasing user interface 120 may be configured to give the user the ability to rearrange the locations of individual columns of information to a new location, such as by dragging via a mouse-activated interface. The ability to change the displayed types of information may allow the user to tailor the display to show the information desired or required by the user to make purchase decisions for a given item. The user might desire to see different information for different items, and different users might desire to see different information for the same item.

Figure 5:
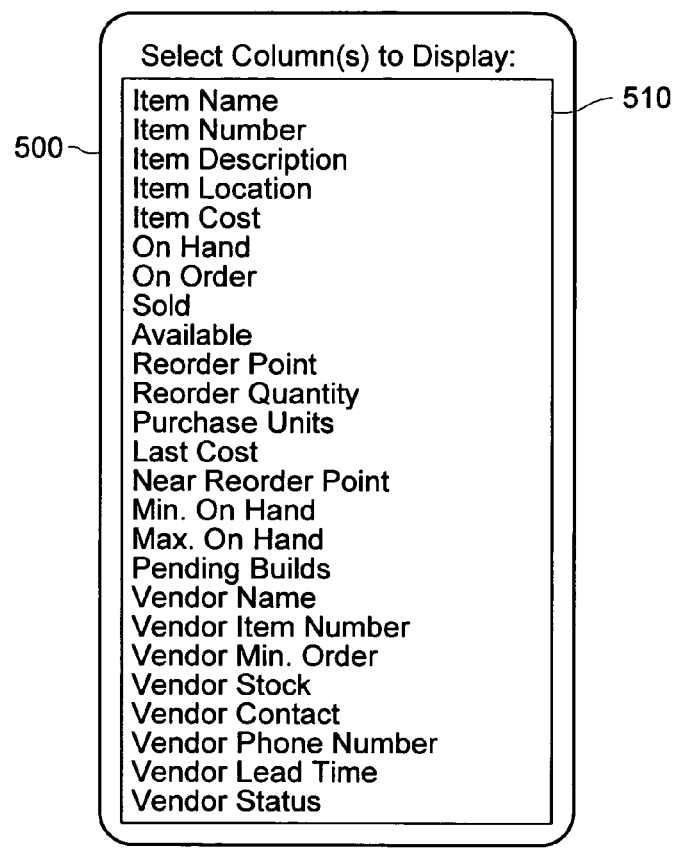
FIG. 5 illustrates one embodiment of a user interface display for customizing purchasing system user interface, as described herein.

As noted above, in some embodiments, purchasing user interface 120 may be configured to give the user the ability to select the type of information displayed in user interface 400. FIG. 5 illustrates one embodiment of a user interface display for allowing the user to select which columns of information are displayed by purchasing user interface 120. Purchasing user interface 120 may display dialog box 500 to allow the user to select a new column to add to the information displayed for each item listed in user interface 400, described above. In list 510 dialog box 500 may list all types of information, both information gathered from databases, such as inventory information 230, vendor information 210 and sales and order information 220, and information that may be calculated from other information and/or values. For example, list 510 may include item and inventory information, such as a reorder quantity, item name, item number (e.g. SKU), item description, item location (e.g. the location the item is physically stored or inventoried), item cost, quantity of item on hand, quantity of item on order, quantity of item currently sold, quantity of item available. In some embodiments, list 510 may also include types of ordering information, such as reorder point value, reorder quantity, purchase unit (e.g. each, case, gross), the last cost of an item, whether or not the item is near its reorder point, a minimum quantity on hand target value, and maximum quantity on hand target value.

Some types of information in list 510 may represent calculated values, such as the available quantity. However, in some embodiments, the available quantity may not be calculated, but gather from an inventory information database, such as inventory information 230. Similarly, in some embodiments, purchasing user interface 120 may calculate and display default values for certain information values. For example, in one embodiment, purchasing user interface 120 may be configured to calculate a default reorder quantity value for each item based on other information values, such as the quantities on hand, on order, sold and/or available. List 510 may include a pending builds entry, which, in some embodiments, may represent a quantity of an item that is expected to be required in the future, but which may not be taken into account when calculating available and/or reorder quantities, as described above. Additionally, some types of information in list 510 may not an actual textual or numeric value, but instead, may allow the user to select to have purchasing user interface display reminder information, such as whether or not an item's inventory is near its reorder point, as described above.

In some embodiments, list 510 may also include types of vendor information, such as vender name, vender item number (e.g. SKU), vender min. order quantity, vender stock quantity, vender contact information, vender phone numbers, vender lead time values, and vendor status information. Purchasing user interface 120 may gather some vendor information from vendors themselves, such as be communicating with a vender server 260, or other vender supplied information source. For example, in one embodiment, information such as the quantity of an item currently in vendor stock, the minimum order required by a vendor, as well as other information types listed above, such as item cost, may be obtained from vendor-supplied information sources by purchasing user interface 120, either automatically or in response to user request. In some embodiments, purchasing user interface 120 may also be configured to received un-requested updates of vendor information from vendor-supplied information sources, such as from vendor server 260.

Other types of vendor information may not be supplied by vendors. For example, in one embodiment, list 510 may include a vendor status entry allowing a user to select to have purchasing user interface 120 display a vendor status as part of the information displayed user interface 400. A vendor status may be a value determined by the enterprise, organization or entity using maintaining the inventory and using purchasing user interface 120. For example, each vender may be assigned a vender status of preferred, non-preferred, or normal. In one embodiment, a vendor's status may be updated each time items are ordered from that vendor according to how well the item order process was completed. In other embodiments, vendor status may be updated in other ways for other reasons. For example, in one embodiment, a vendor status may represent a particular relationship between the vendor and enterprise or entity using purchasing user interface 120. In other embodiments, vendor status may correspond to the relative cost of items obtainable via different vendors, the cost of shipping items from respective vendors, the length of time the enterprise or entity as been working with a particular vendor, or other factors.

In yet other embodiments, vendor status information may represent or correspond to a vendor reputation, such as a reputation established in response to feed back provided by various people of the enterprise, entity or organization using purchasing user interface 120. A vendor reputation may indicate the quality of a vendor's items and/or customer service, for example. In some embodiments, vendor reputation values may be calculated automatically by purchasing user interface, or another system, in response to inputs received that describe interactions with a vendor, such as the number of purchases made from the vendor and/or the frequency at which items are returned to the vendor or at which vendor charges are disputed.

Purchasing user interface 120 may be configured to allow a user to select columns from list 510 in different manners according to various embodiments. For example, in one embodiment, list 510 may include individual check boxes or other controls allowing a user to select one or more entries. In another embodiment, purchasing user interface 120 may be configured to allow a user to select one or more entries from list 510 using either a mouse or keyboard interface, such as by clicking on each selected entry or using particular key combinations. In general, any suitable method for allowing selection of one or more entries from a list of information types may be utilized by purchasing user interface 120, according to various embodiments.

Please note that FIG. 5 illustrates just one manner of allowing a user to customize the information displayed by purchasing user interface 120. In other embodiments, other functionality, interfaces and/or actions may be used to allow the user to customize the information displayed. For example, in one embodiment, purchasing user interface 120 may be configured to allow a user to configure a new column or type of information, such as by defining a new calculation based on other information values available to purchasing user interface 120. In yet another embodiment, purchasing user interface may be configured to allow the user to specify a new information source, such as by linking a new column header to a spreadsheet or database file using a known data communication format.

Figure 6:
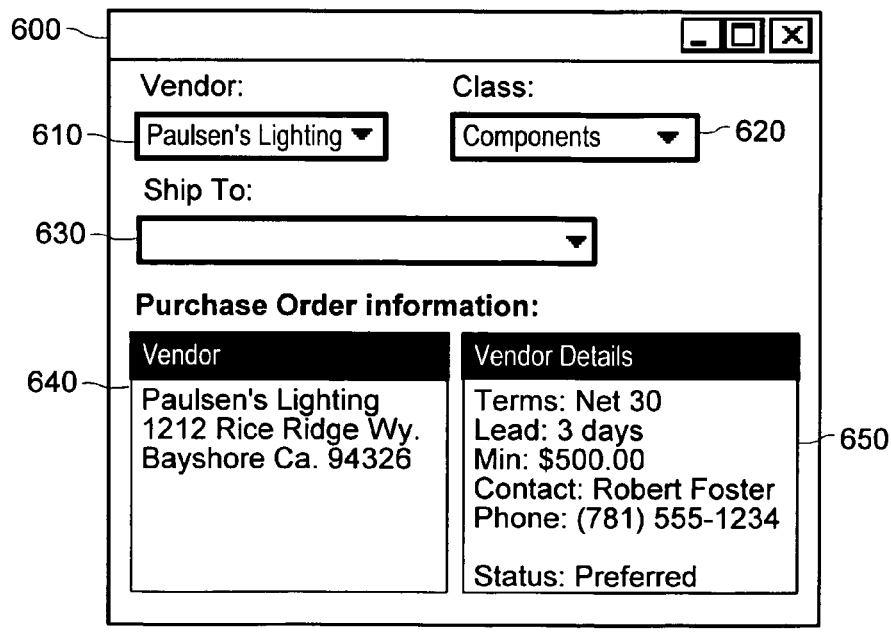
FIG. 6 illustrates one embodiment of a user interface displaying vendor information, as displayed herein, as described herein.

In addition to displaying vendor information for each item, as described above, purchasing user interface may also display vendor information in other manners. For example, FIG. 6 illustrates one embodiment of a user interface display of vendor information regarding a purchase order. Purchasing user interface 120 may be configured to allow a user to easily browse through purchase order information by vendor. Thus, dialog box 600 may include user interface elements, such as vendor listing 610, allowing the user to the select a particular vendor for which to see purchase order information. In response to a user selecting a vendor in vendor list 610, purchasing user interface 120 may update the other fields in the dialog box 600, according to one embodiment. In other embodiments, dialog box 600 may include other fields allowing a user to select or browse vendor purchase order information. For example, dialog box 600 may include a class list 620, from which a user may select a class of vendors for which to view purchase order information. Additionally, class listing 620 may also be updated by purchasing user interface 120 to reflect the class of a vendor selected by a user via vendor listing 610.

Dialog box 600 may also include other user interface elements via which a user may view, update or modify purchase order information for a vendor. For example, ship to field 630 may indicate the address to which a vendor is supposed to ship ordered items. In some embodiments, ship to field 630 may represent a standard or default ship to address configured with the particular vendor, while in other embodiments, ship to field 630 may be set or modifiable on a purchase order by purchase order basis. Thus, in some embodiments, dialog box 600 may display the current, standard or default values for various purchase order related vendor information (e.g. information a vendor is supposed to use for all orders) but in other embodiments dialog box 600 may display purchase order specific vendor information (e.g. information that may change from purchase order to purchase order). In yet other embodiments, purchasing user interface 120 may include two different version of dialog box 600, one for standard or default purchase order vender information and one for purchase order specific vendor information.

Additionally, dialog box 600 may include user interface elements 640 and 650 displaying aggregates of vendor information. For example, user interface element 640 may include vendor name and address information, while user interface element 650 may display vendor order information, such as the order terms available from the vendor (e.g. net 30), vendor lead time (e.g. 3 days), minimum order information (e.g. 50 units, $500), vendor contact information, such as the name and phone number of a sales or customer service representative, and vendor status or reputation information, among other types of vendor information.

In some embodiments, purchasing user interface 120 may only allow viewing of the information displayed in dialog box 600. In other embodiments, purchasing user interface 120 may also allow a user to update information displayed in dialog box 600. For example, purchasing user interface 120 may be configured to allow a user to change the address displayed in ship to field 630 and in response, purchasing user interface 120 may use the new address as the ship to address on all future purchase orders for the corresponding vendor, according to one embodiment. In some embodiments, purchase user interface 120 may only allow certain users or certain types of users (e.g. managers or administrators) to update or modify the information displayed in dialog box 600.

As described above for the information displayed in user interface 400, purchasing user interface 120 may, in some embodiments, be configured to allow a user to change or customize the information or types of information displayed in dialog box 600. For example, purchasing user interface 120 may be configured to provide a dialog box similar to that described above regarding FIG. 5 that allows a user to select the specific types of information to be displayed in dialog box 600. For example, purchase user interface 120 may allow the user to add new types of information, such as the number of orders currently placed with the vendor, the date of the last order placed with the vendor, the total number of items ordered from the vendor over, and other types of items. As with the types of information described above regarding user interface 400, purchasing user interface 120 may be configured to calculate values based on other information for display in dialog box 600, and may, in some embodiments, allow a user to define new calculations for additional values to be displayed in dialog box 600. Thus, purchasing user interface may allow a user to customize or tailor the information displayed in dialog box 600 to meet that user's particular desires or needs.

Additionally, FIG. 6 represents just one possible manner to present vendor information. In other embodiments, purchasing user interface 120 may present the information in other manners. For example, in one embodiment, purchasing user interface 120 may present purchase order information for all vendors in a single display using a table of rows and columns, similar to that described above regarding FIG. 4. Additionally, purchasing user interface 120 may be configured to display in dialog box 600 additional vendors from which items of a particular purchase order may be obtained, such as to allow a user to determine whether a particular item is being ordered from the most appropriate vendor.

Figure 7:
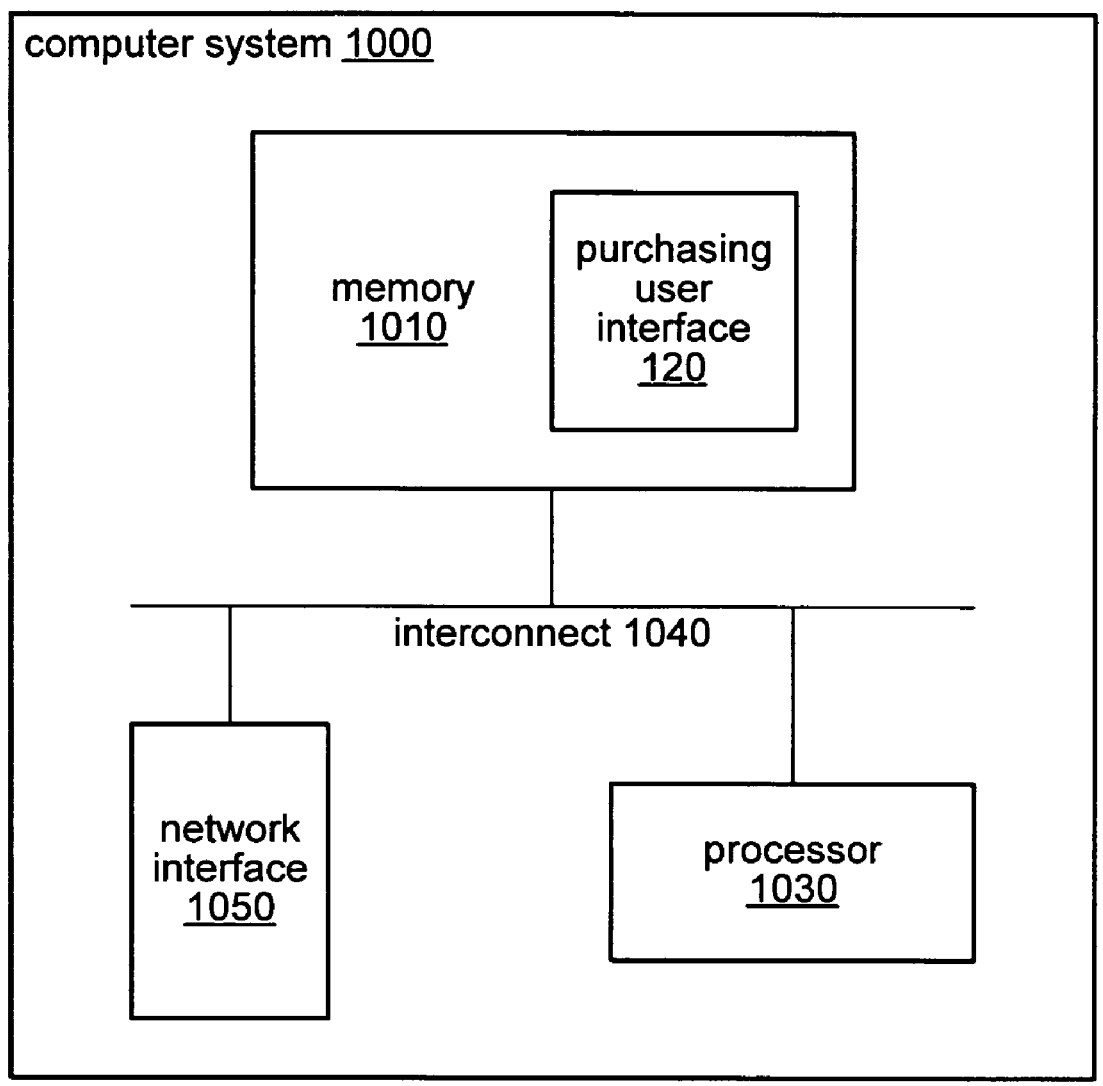
FIG. 7 illustrates a computing system capable of implementing purchasing user interface system, according to one embodiment.

As described above, purchasing user interface 120 may execute on various types of computer systems. FIG. 7 illustrates a computing system capable of implementing a purchasing user interface system, such as purchasing user interface 120, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, or in general any type of computing device. In some embodiments, computer system 1000 may represent inventory and purchasing system 200, described above.

The described invention may be provided as a computer program product, or software, that may include a computer-readable medium having stored thereon instructions, which may be used to program a computer system (or other electronic devices) to implement an purchasing user interface system as described herein. A computer-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 1000 may includes a processor unit 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. Embodiments of the invention may include fewer or additional components not illustrated in FIG. 10 (e.g., video cards, audio cards, storage devices, additional network interfaces, peripheral devices, or other components). The processor unit 1030, the network interface 1050, and the system memory 1010 may be coupled to the interconnect 1040. It should also be noted that one or more components of system 1000 may be located remotely and accessed via a network. One or more of the system memories 1010 may embody a purchasing user interface 120.

Network interface 1040 may be configured to enable computer system 1000 to communicate with other computers, systems or machines, such as across network 250, described above. Network 250 may enable data communication between computer system 1000 and among other entities illustrates in FIG. 2, described above. Network interface 1040 may use standard communications technologies and/or protocols. Network 250 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 250 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 250 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

In some embodiments, memory 1010 may include program instructions configured to implement a purchasing user interface 120, as described herein. Purchasing user interface 120 may be implemented in any of various programming languages or methods. For example, in one embodiment, purchasing user interface 120 may be JAVA based, while in another embodiments, it may be implemented using the C or C++ programming languages.

While the invention has been described with reference to various embodiments, it will be understood that these embodiments are illustrative and that the scope of the invention is not limited to them. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
   a processor; and
   a memory coupled to the processor, wherein the memory comprises program instructions executable by the processor to implement a purchasing tool configured to provide a purchasing user interface, wherein the purchasing user interface is configured to:
   receive inventory information, vendor information, and sales information;
   display, to a plurality of users, inventory information associated with an item of a current inventory of items;
   display, to the plurality of users, vendor information associated with a first vendor of a plurality of vendors that supplies the item;
   display, to the plurality of users, sales information associated with the item, wherein the sales information comprises historical sales and projected sales information;

receive, based on the sales information, a first input from a first user of the plurality of users selecting the item and ordering a first amount of the item from the first vendor;

receive updated projected sales information from a second user of the plurality of users;

display, to the plurality of users, updated sales information associated with the item, wherein the updated sales information comprises the updated projected sales information; and receive, in response to displaying the updated sales information, a second input from a third user of the plurality of users selecting the item, wherein the second input modifies the first amount to generate a second amount of the item to order from the first vendor, wherein the purchasing tool is configured to generate one or more purchase orders for ordering the second amount of the item from the first vendor.

2. The system of claim 1, wherein the purchasing user interface is further configured to:

receive the second input specifying a second vendor of the plurality of vendors from which to order the item, and wherein the purchasing tool is configured to generate the one or more purchase orders for ordering the second amount of the item from the second vendor.

3. The system of claim 1, wherein the purchasing user interface is further configured to:

display current sales information associated with the current inventory of items.

4. The system of claim 1, wherein the purchasing user interface is further configured to:

display sales history information associated with the current inventory of items.

5. The system of claim 1, wherein the purchasing user interface is further configured to:

display projected sales growth information associated with the current inventory of items.

6. The system of claim 1, wherein the inventory information comprises at least one selected from a group consisting of on hand amounts, on order amounts, sold amounts, available amounts, reorder point, target inventory amount, and pending build amounts associated with the current inventory of items.

7. The system of claim 1, wherein the vendor information comprises vendor status information associated with each of the plurality of vendors, wherein the vendor status information indicates a vendor status of one selected from a group consisting of preferred, non-preferred, and normal.

8. The system of claim 1, wherein the purchasing user interface is further configured to:

receive user input selecting particular types of inventory, vendor, and sales information to display regarding the current inventory of items.

9. The system of claim 1, wherein the purchasing tool is further configured to:

receive vendor pricing information regarding the item from one or more remote vendor systems, wherein the purchasing user interface is further configured to display the vendor pricing information regarding the item.

10. The system of claim 9, wherein the purchasing tool is further configured to receive the vendor pricing information over the Internet.

11. The system of claim 1, wherein the purchasing tool is further configured to print the one or more purchase orders.

12. The system of claim 1, wherein the purchasing tool is further configured to generate the one or more purchase orders electronically.

13. The system of claim 1, wherein the purchasing user interface is further configured to display a total cost corresponding to a combined cost for the one or more purchase orders.

14. The system of claim 1, wherein the purchasing user interface is further configured to display the vendor information in a separate popup display.

15. The system of claim 1, wherein the vendor information comprises vendor lead times regarding the item.

16. A computer-readable non-transitory storage medium, comprising program instructions configured to implement a purchasing tool configured to provide a purchasing user interface, wherein the purchasing user interface is configured to implement:

receiving inventory information, vendor information, and sales information;

displaying, to a plurality of users, inventory information associated with an item of a current inventory of items;

displaying, to the plurality of users, vendor information associated with a first vendor of a plurality of vendors that supply the item;

displaying, to the plurality of users, sales information associated with the item, wherein the sales information comprises historical sales and projected sales information;

receiving, based on the sales information, a first input from a first user of the plurality of users selecting the item and ordering a first amount of the item from the first vendor;

receiving updated projected sales information from a second user of the plurality of users;

displaying, to the plurality of users, updated sales information associated with the item, wherein the updated sales information comprises the updated projected sales information; and receiving, in response to displaying the updated sales information, a second input from a third user of the plurality of users selecting the item, wherein the second input modifies the first amount to generate a second amount of the item to order from the first vendor, wherein the purchasing tool is configured to implement generating one or more purchase orders for ordering the second amount of the item from the first vendor.

17. The computer-readable non-transitory storage medium of claim 16, wherein the purchasing user interface is further configured to implement receiving a third input specifying a second vendor from the plurality of vendors from which to order the item, wherein the purchasing tool is further configured to implement generating the one or more purchase orders for ordering the second amount of the item from the second vendor.

18. The computer-readable non-transitory storage medium of claim 16, wherein the purchasing user interface is further configured to implement receiving user input selecting particular types of inventory, vendor and sales information to display regarding the current inventory of items.

19. The computer-readable non-transitory storage medium of claim 16, wherein the purchasing tool is further configured to implement receiving vendor pricing information regarding one or more of items of the current inventory of items from one or more remote vendor systems.

20. The computer-readable non-transitory storage medium of claim 16, wherein the purchasing user interface is further configured to implement displaying the vendor information in a separate popup display.

21. The computer-readable non-transitory storage medium of claim 16, wherein the vendor information comprises vendor lead times regarding the item.

22. A computer-implemented method, comprising:
receiving inventory information, vendor information, and sales information;
displaying, to a plurality of users, inventory information associated with an item of a current inventory of items;
displaying, to the plurality of users, vendor information associated with a first vendor of a plurality of vendors that supplies the item;
displaying, to the plurality of users, sales information associated with the item, wherein the sales information comprises historical sales and projected sales information;
receiving, based on the sales information, a first input from a first user of the plurality of users selecting the item and ordering a first amount of the item from the first vendor;
receiving updated projected sales information from a second user of the plurality of users;
displaying, to the plurality of users, updated sales information associated with the item, wherein the updated sales information comprises the updated projected sales information;
receiving, in response to displaying the updated sales information, a second input from a third user of the plurality of users selecting the item, wherein the second input modifies the first amount to generate a second amount of the item to order from the first vendor; and
generating one or more purchase orders for ordering the second amount of the item from the first vendor,
wherein said displaying user inventory information, said displaying vendor information, and said receiving the first and second input are performed on a purchasing user interface of a purchasing tool.

23. The computer-implemented method of claim 22, further comprising:
receiving the second input specifying a second vendor from which to order the item; and
generating the one or more purchase orders for ordering the second amount of the item from the second vendor.

24. The computer-implemented method of claim 22, further comprising:
receiving user input selecting particular types of inventory, vendor and sales information to display regarding the current inventory of items.

25. The computer-implemented method of claim 22, further comprising:
receiving vendor pricing information regarding the item from one or more remote vendor systems.

26. The computer-implemented method of claim 22, further comprising:
displaying the vendor information in a separate popup display.

27. The computer-implemented method of claim 22, wherein the vendor information comprises vendor lead times regarding the item.

* * * * *

UNITED STATES PATENT AND TRADEMARK OFFICE
CERTIFICATE OF CORRECTION

| | | |
|---|---|---|
| PATENT NO. | : 7,881,987 B1 | Page 1 of 1 |
| APPLICATION NO. | : 11/447658 | |
| DATED | : February 1, 2011 | |
| INVENTOR(S) | : Matt E. Hart et al. | |

It is certified that error appears in the above-identified patent and that said Letters Patent is hereby corrected as shown below:

On Page 2, in the last line under OTHER PUBLICATIONS, "Feb. 6, 200" should read as -- Feb. 6, 2002 --.

Signed and Sealed this
Twenty-sixth Day of April, 2011

David J. Kappos
*Director of the United States Patent and Trademark Office*